F. G. LAWRENCE.
ATTACHMENT FOR STOVES.
APPLICATION FILED JULY 7, 1911.
1,096,039.
Patented May 12, 1914.
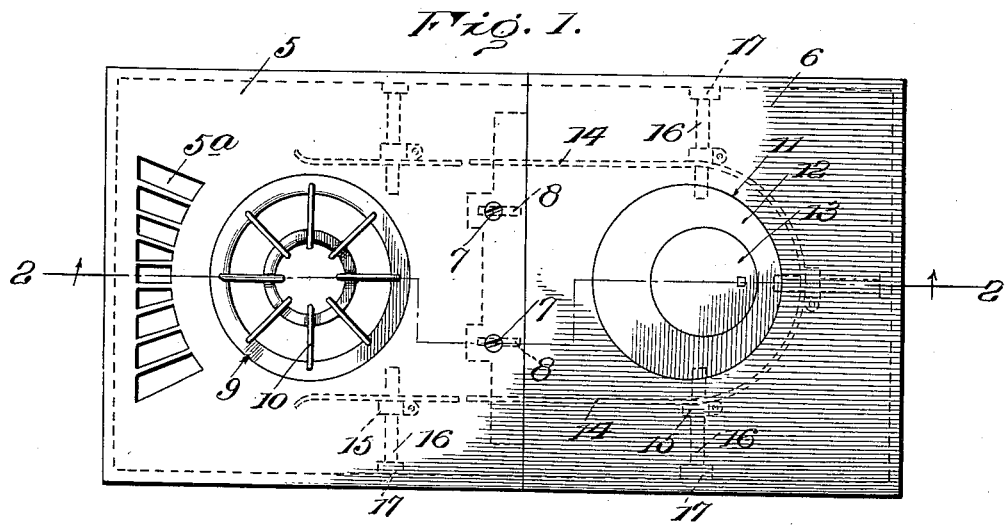
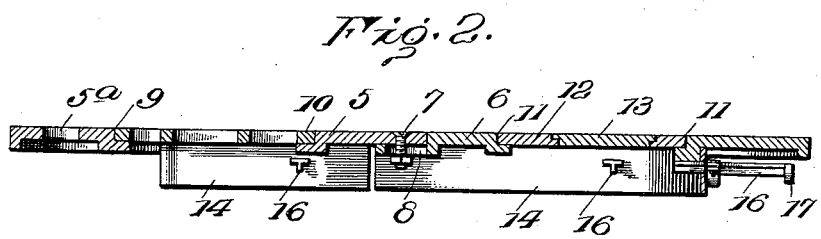
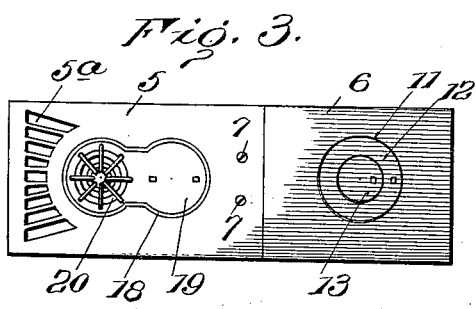
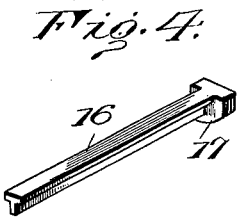
Inventor
F. G. Lawrence
Witnesses
W. A. Williams
Dudley Brown
By Attorneys

UNITED STATES PATENT OFFICE.

FRANK G. LAWRENCE, OF INDIANAPOLIS, INDIANA, ASSIGNOR, BY MESNE ASSIGNMENTS, OF TWO-THIRDS TO LAWRENCE HEAT DISTRIBUTOR COMPANY, OF INDIANAPOLIS, INDIANA, A CORPORATION.

ATTACHMENT FOR STOVES.

1,096,039.

Specification of Letters Patent.

Patented May 12, 1914.

Application filed July 7, 1911. Serial No. 637,364.

*To all whom it may concern:*

Be it known that I, FRANK G. LAWRENCE, citizen of the United States, residing at Indianapolis, in the county of Marion and State of Indiana, have invented certain new and useful Improvements in Attachments for Stoves, of which the following is a specification.

My invention relates to certain new and useful improvements in attachments for stoves, whereby the heat of a gas or oil stove may be more completely utilized, and consequently the amount of fuel necessarily reduced.

A further object of my invention is to produce an attachment of this character which is adjustable to various sizes of stoves, and one which may be readily attached to and detached from a stove.

A further object of my invention is to produce a device which is simple and cheap to construct, and which will be well adapted to withstand the heat, and durable.

With these and other objects in view my invention consists in certain constructions, combinations and arrangements of parts, the preferred form of which will be first described in connection with the accompanying drawings, and then the invention particularly pointed out in the appended claims.

Referring to the drawings wherein the same part is designated by the same reference numeral wherever it occurs Figure 1 is a top plan view of one form of my invention; Fig. 2 is a longitudinal section on the line 2—2 of Fig. 1; Fig. 3 is a top plan view of a modification on a smaller scale, and Fig. 4 is an attaching bar which is used in connection with the construction shown in Fig. 1.

My device comprises a base formed by two top plates 5 and 6, which are connected together at their adjacent ends by means of bolts 7, passing through elongated slots 8 in extensions on the edge of the plate 6, whereby the total length of the base may be increased or diminished to fit varying sizes of stoves. The bolts are passed through the slots, 8, and are supported in the plate 5. The part 5 is provided with an opening 9 in which fits an ordinary open grid 10 commonly used to cover the burners of gas or oil stoves and on which the cooking utensils may be supported. The plate 5 is formed with a series of openings $5^a$ beyond the opening 9, for a purpose to be described.

11 designates an opening in the plate 6 in which fits a lid 12, having formed therein an eccentrically disposed opening which receives a smaller or sectional lid 13. On the underside of the face is a U-shaped rim or deflector 14, which closely surrounds the opening 11, with the ends of the U extending beneath the plate 5. The U-shape deflector and the bottom of the base provides a passage for the exit of heat from a burner located under the lid to the grid located adjacent the open end of said deflector. This deflector is also provided with lugs 15 through which pass centering or spacing bars 16, having heads 17 thereon which bear against the sides of the gas or oil stove when the ordinary top with which the same is provided is removed, and my attachment is applied.

In the use of my invention the ordinary top provided on a gas or oil stove is removed and my device is substituted therefor. The length of the plate is adjusted by means of the bolts 7, and then the device is secured in place by adjusting the centering or spacing bars 16 in the lugs 15 until their heads engage the walls of the opening of the stove. When the burner under the opening 11 is lighted and the opening closed either by means of the lid 12, or by a cooking utensil of sufficient size to cover the opening 11 without the ring, then the heat from the burner beneath this opening is deflected by rim 14 underneath the base and out through the opening 9. The open end of the U shape deflector admits a supply of air, the latter being drawn in from the atmosphere through the openings $5^a$ by the heat in passing through the opening 9. The introduction of air to the products of combustion at this point will greatly increase the efficiency of the heat. Over this opening a second utensil can be placed so that two cooking operations may be carried on simultaneously with the use of but a single burner. By means of the lid 12 the opening therein may be changed so as to bring the same directly over the burner, or at one side thereof, in order to vary the amount of heat given to a cooking utensil thereon.

In the form of my invention shown in the modification in Fig. 3 the construction of the plates 5 and 6 is the same as that described in connection with Fig. 1, but the opening in the plate 5 is in the form of a figure 8, as shown at 18, and is adapted to be closed by a cover comprising a solid portion 19, and an open portion 20 covered by a grid 21, similar to the grid 10. By lifting the cover and reversing the same the opening 20 can be brought closer to or farther from the burner under the opening 11 in the plate 6, in order to vary the amount of heat received at the opening 20.

Having thus described my invention what I claim as new and desire to secure by Letters Patent is:

1. An attachment for stoves comprising a base formed with openings, a deflector depending from the base, said deflector extending along the sides of the openings and around one of said openings, the deflector terminating adjacent the other opening to form an air inlet, the base having openings adjacent the terminals of the deflector to admit air to the air inlet, a closed lid fitted in one of the openings and a grid fitted in the other said opening, the deflector and the bottom of the base between the latter forming a passage for the products of combustion introduced below the lid, the products of combustion passing through the grid drawing in a supply of air and thereby improving said combustion at the grid.

2. An attachment for stoves comprising a base formed of two plates, each plate having an opening distanced from the meeting edges of said plates, a deflector on the bottom of the base, said deflector starting from a point adjacent one opening and extending along the sides of both openings and partially around the other opening, then extending along the opposite sides of both openings and terminating adjacent the first-mentioned opening, the open end of the deflector forming an air inlet passage, means for longitudinally adjusting the two plates, a closed lid in the opening which is partially surrounded by the deflector, and a grid in the opening in the companion plate whereby the heat generated under the closed lid will be directed to the grate and a supply of air will be introduced through the air inlet passage to mix with and improve the products of combustion passing through the grid.

3. An attachment for stoves comprising two plates, one of said plates having slotted extensions, bolts passing through the slots in said extensions and into the companion plate, whereby the plates may be longitudinally adjusted, each plate being formed with an opening, a closed lid fitted in one of the openings, a grid fitted in the other of said openings, a deflector rib on the under side of the plates, said deflector rib extending from a point adjacent the opening having the grid and partially around the opening having the closed lid and terminating at the opposite side of and adjacent the opening having the grid, the plate supporting the grid having a series of openings beyond the terminals of the deflector, and means carried by the plates to support same on a stove.

In testimony whereof I affix my signature in presence of two witnesses.

FRANK G. LAWRENCE.

Witnesses:
GEO. W. STEPHENS,
AUGUST C. GRASSOW.

---

Copies of this patent may be obtained for five cents each, by addressing the "Commissioner of Patents, Washington, D. C."